(12) United States Patent
Xing et al.

(10) Patent No.: US 9,794,966 B2
(45) Date of Patent: Oct. 17, 2017

(54) IDENTIFIER ASSIGNMENT METHOD AND DEVICE IN WIRELESS LOCAL AREA NETWORK

(75) Inventors: Weimin Xing, Shenzhen (CN); Nan Li, Shenzhen (CN); Bo Sun, Shenzhen (CN); Kaiying Lv, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 61 days.

(21) Appl. No.: 14/232,596

(22) PCT Filed: Apr. 16, 2012

(86) PCT No.: PCT/CN2012/074149
§ 371 (c)(1),
(2), (4) Date: Jan. 13, 2014

(87) PCT Pub. No.: WO2012/155742
PCT Pub. Date: Nov. 22, 2012

(65) Prior Publication Data
US 2014/0146809 A1    May 29, 2014

(30) Foreign Application Priority Data
Jul. 26, 2011  (CN) .......................... 2011 1 0210563

(51) Int. Cl.
*H04W 76/02*    (2009.01)
*H04W 4/08*    (2009.01)
(Continued)

(52) U.S. Cl.
CPC ............ *H04W 76/021* (2013.01); *H04W 4/08* (2013.01); *H04W 8/26* (2013.01); *H04W 84/12* (2013.01)

(58) Field of Classification Search
CPC ....... H04W 76/021; H04W 8/26; H04W 4/08; H04W 84/12
See application file for complete search history.

(56) References Cited

U.S. PATENT DOCUMENTS 7,804,842 B2   9/2010  Malik
8,144,707 B2   3/2012  Zhang
(Continued)

FOREIGN PATENT DOCUMENTS

CN    1846374 A    10/2006
CN    101217805 A   7/2008
(Continued)

OTHER PUBLICATIONS

International Search Report in international application No. PCT/CN2012/074149, dated Jul. 19, 2012.
(Continued)

*Primary Examiner* — Mohammad Anwar
(74) *Attorney, Agent, or Firm* — Oppedahl Patent Law Firm LLC

(57) ABSTRACT

The disclosure discloses an identifier assignment method in a Wireless Local Area Network (WLAN), which includes: a group identifier is set for a non-Access Point Station (STA). The method further includes: in a process during which the STA associates or reassociates to an Access Point (AP), a terminal identifier is assigned to the associated or reassociated STA or a terminal identifier and a group identifier are assigned to the associated or reassociated STA. The disclosure also discloses an identifier assignment device in a WLAN for implementing the terminal access method. The terminal identifier is significantly expanded through the setting of the group identifier, so that a unique identifier can be assigned to the STA accessing to the AP without identifier repetition of the STA. Meanwhile, the grouping of the STA also facilitates the scheduling and management of the STA in a group. The disclosure ensures that sufficient STAs can access to the AP and a different identifier can be assigned to each STA.

9 Claims, 2 Drawing Sheets

| Terminal identifier information (zeroth bit to twelfth bit (bit)) | Group identifier information (thirteenth bit to fifteenth bit (bit)) |
|---|---|

| Terminal identifier information (zeroth bit to twelfth bit (bit)) | Group identifier information (thirteenth bit, fourteenth bit (bit)) | Reserved bit (fifteenth bit (bit)) |
|---|---|---|

(51) Int. Cl.
*H04W 8/26* (2009.01)
*H04W 84/12* (2009.01)

(56) References Cited

U.S. PATENT DOCUMENTS

| | | | | |
|---|---|---|---|---|
| 8,526,346 B1* | 9/2013 | Liu | .................. | H04W 52/0229 370/311 |
| 2005/0254444 A1* | 11/2005 | Meier et al. | .................. | 370/312 |
| 2006/0164969 A1* | 7/2006 | Malik et al. | .................. | 370/203 |
| 2006/0274776 A1 | 12/2006 | Malik | | |
| 2007/0058566 A1* | 3/2007 | Frederiks et al. | ............ | 370/253 |
| 2007/0297379 A1* | 12/2007 | Gorokhov | ............. | H04L 1/0045 370/338 |
| 2008/0247371 A1* | 10/2008 | Kwon | .................... | H04W 8/24 370/338 |
| 2009/0252165 A1 | 10/2009 | Zhang | | |
| 2010/0056175 A1* | 3/2010 | Bachmann | .............. | H04W 8/08 455/456.1 |
| 2011/0064040 A1* | 3/2011 | Kim et al. | .................... | 370/329 |
| 2012/0099507 A1 | 4/2012 | Zhang | | |
| 2012/0106531 A1 | 5/2012 | Seok | | |

FOREIGN PATENT DOCUMENTS

| | | |
|---|---|---|
| CN | 101222388 A | 7/2008 |
| JP | 20080006602 A | 1/2008 |
| JP | 20110058713 A | 6/2011 |
| KR | 20080006602 A | 1/2008 |
| KR | 20100057837 A | 6/2010 |
| KR | 20110058713 A | 6/2011 |
| WO | 2006115999 A2 | 11/2006 |
| WO | 2011005004 A2 | 1/2011 |

OTHER PUBLICATIONS

English Translation of the Written Opinion of the International Search Authority in international application No. PCT/CN2012/074149, mailed on Jul. 19, 2012.

* cited by examiner

| Terminal identifier information (zeroth bit to twelfth bit (bit)) | Group identifier information (thirteenth bit to fifteenth bit (bit)) |
|---|---|

| Terminal identifier information (zeroth bit to twelfth bit (bit)) | Group identifier information (thirteenth bit, fourteenth bit (bit)) | Reserved bit (fifteenth bit (bit)) |
|---|---|---|

| AID field (byte (Octets): 2) | ... | GID field (byte (Octets): 1) |
|---|---|---|

Fig. 3(a)

| Terminal identifier information (zeroth bit to eleventh bit (bit)) | Group identifier information (twelfth bit, thirteenth bit (bit)) | Reserved bits (fourteenth bit, fifteenth bit (bit)) |
|---|---|---|

Fig. 3(b)

| Terminal identifier information (zeroth bit to tenth bit (bit)) | Group identifier information (eleventh bit to thirteenth bit (bit)) | Reserved bits (fourteenth bit, fifteenth bit (bit)) |
|---|---|---|

Fig. 3(c)

| AID field (byte (Octets): 2) | ... | GID field (byte (Octets): 1) |
|---|---|---|

Fig. 4

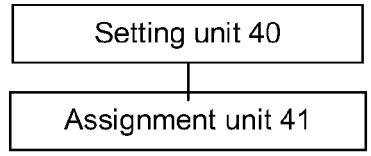

IDENTIFIER ASSIGNMENT METHOD AND DEVICE IN WIRELESS LOCAL AREA NETWORK

TECHNICAL FIELD

The disclosure relates to technology of identifying a terminal in a Wireless Local Area Network (WLAN), and in particular to an identifier assignment method and device in a WLAN.

BACKGROUND

At present, with the rapid development of the WLAN, the application range of the WLAN is increasingly enlarged. In order to cope with various network requirements, the industrial standard IEEE802.11 Group of Institute of Electrical and Electronics Engineers (IEEE) issues a series of basic WLAN technical standards such as 802.11ah, 802.11b, 802.11g, 802.11n and the like, and then other task groups are established in succession to develop specifications involved in technical improvements of existing 802.11. For example, with the development of an Internet of Things, IEEE has set up an IEEE 802.11ah task group. A main task of the IEEE 802.11ah task group is to modify and enhance a Media Access Control (MAC) layer and a Physical (PHY) layer of the WLAN to accommodate requirements for networks such as a Smart Grid, an Environmental/Agricultural Monitoring network, an Industrial Process Automation network and the like.

In the WLAN, an Access Point (AP) and a plurality of non-AP Stations (STAs) associated with the AP constitute a Basic Service Set (BSS). An STA, before using a service of the BSS, has to complete authentication and association processes along with the AP. FIG. 1 is a flow chart where an STA accesses to an AP. As shown in FIG. 1, the process during which the STA accesses to the AP is as follows. The STA acquires a system information parameter of the BSS by sending a Probe Request frame and receiving a Probe Response frame to which the AP responds, or by receiving a Beacon frame broadcast by the AP. The STA sends an Authentication Request frame to the AP for authentication. The AP returns an Authentication Response frame to respond to the Authentication Request frame. The Authentication Response frame indicates whether the authentication is successful. After the authentication is completed, the STA proceeds to the association process. The STA sends an Association Request frame to the AP for association. The AP returns an Association Response frame to respond to the Association Request frame. The Association Response frame indicates whether the association is successful. If the association is successful, an Association Identifier (AID) is assigned to the STA in the Association Response frame. If the authentication and association processes are successful, the STA completes a basic access process.

A reassociation process is as follows. If the STA wishes to reassociate with the AP, the STA sends a Reassociation Request frame to the associated AP for reassociation. The AP returns a Reassociation Response frame to respond to the Reassociation Request frame. The Reassociation Response frame in which a new AID reassigned to the STA is included indicates whether the reassociation is successful. After the reassociation is completed, the STA can transfer data along with the AP by using the new AID.

In a new WLAN application scenario, it is required that the AP can support up to 6000 STAs. So many STAs also raise many new problems for the network. The first problem is that there are no enough station identifiers available for assignment in the network. For example, there are 1 to 2007 available AIDs in a WLAN system. Each STA of these identifiers cannot be identified one by one when the number of the STAs exceeds 2007. Secondly, more effective network management is needed when there are many stations. However, in a practical application, different STAs may have different application categories (such as an intelligent water meter, an intelligent ammeter, an intelligent gas meter), which belong to different manufacturer operation managements respectively and also require different power saving capabilities. But in the existing WLAN protocol, when the AP assigns the identifiers, the AP does not distinguish the STAs according to the characteristics of the STAs, namely, the AP does not group the STAs.

When there are a large number of STAs in the network and the characteristics of these STAs are different each other, there are problems of no enough assignable AIDs, lack of effective station grouping management and the like.

SUMMARY

In view of the above, the disclosure is intended to provide an identifier assignment method and device in a WLAN, by which a unique identifier can be assigned to each STA accessing to an AP uniformly without the repetition of the identifier assigned to the STA.

To this end, the technical solutions of the disclosure are implemented as follows.

An identifier assignment method in a WLAN includes: a group identifier is set for an STA. The method further includes:

in a process during which the STA associates or reassociates to an AP, a terminal identifier is assigned to the associated or reassociated STA or a terminal identifier and a group identifier are assigned to the associated or reassociated STA.

Preferably, the step that in a process during which the STA associates or reassociates to an AP, a terminal identifier is assigned to the associated or reassociated STA or a terminal identifier and a group identifier are assigned to the associated or reassociated STA may include:

the STA sends an association request frame or a reassociation request frame to the AP, wherein the association request frame or the reassociation request frame includes at least one of followings: application category information of the STA, power saving capability information of the STA, operator's identifier information of the STA, manufacturer's identifier information of the STA and physical location information of the STA; and the AP returns an association response frame or a reassociation response frame to the STA, wherein the association response frame or the reassociation response frame includes the terminal identifier assigned by the AP to the STA, or the terminal identifier and the group identifier assigned by the AP to the STA.

Preferably, the AP may determine grouping of the STA and the group identifier according to at least one of followings: the application category information of the STA, the power saving capability information of the STA, the operator's identifier information of the STA, the manufacturer's identifier information of the STA and the physical location information of the STA.

Preferably, the group identifier may be composed of bits in bytes corresponding to an Association Identifier (AID); or the group identifier is composed of bits in a separately set byte.

Preferably, the AID may be 2 bytes, and the separately set byte may be 1 byte.

Preferably, the terminal identifier may be 11 bits, or 12 bits, or 13 bits, and the group identifier may be 1 bit, or 2 bits, or 3 bits.

An identifier assignment device in a WLAN includes a setting unit and an assignment unit, wherein the setting unit is configured to set a group identifier for an STA; and the assignment unit, located in an AP, is configured to, in a process during which the STA associates or reassociates to the AP, assign a terminal identifier or a terminal identifier and a group identifier to the associated or reassociated STA.

Preferably, the device may further include:

a sending unit configured to return an association response frame or a reassociation response frame to the STA when the STA sends an association request frame or a reassociation request frame to the AP, wherein the association request frame or the reassociation request frame includes at least one of followings: application category information of the STA, power saving capability information of the STA, operator's identifier information of the STA, manufacturer's identifier information of the STA and physical location information of the STA; and the association response frame or the reassociation response frame includes the terminal identifier assigned by the AP to the STA, or the terminal identifier and the group identifier assigned by the AP to the STA.

Preferably, the assignment unit may be further configured to determine grouping of the STA and the group identifier according to at least one of followings: the application category information of the STA, the power saving capability information of the STA, the operator's identifier information of the STA, the manufacturer's identifier information of the STA and the physical location information of the STA.

Preferably, the group identifier may be composed of bits in bytes corresponding to an Association Identifier (AID); or the group identifier may be composed of bits in a separately set byte.

Preferably, the AID may be 2 bytes, and the separately set byte may be 1 byte; and the terminal identifier may be 11 bits, or 12 bits, or 13 bits, and the group identifier may be 1 bit, or 2 bits, or 3 bits.

In the disclosure, an STA accessing to an AP is grouped, and a corresponding group identifier is set for the STA. In this way, numerous STAs accessing to the AP can be identified by a terminal identifier and in conjunction with the group identifier. Since the terminal identifier is significantly expanded through the setting of the group identifier, a unique identifier can be assigned to the STA accessing to the AP without identifier repetition of the STA. Meanwhile, the grouping of the STA also facilitates the scheduling and management of the STA in a group. The disclosure ensures that sufficient STAs can access to the AP and a different identifier can be assigned to each STA.

BRIEF DESCRIPTION OF THE DRAWINGS

FIGS. 3(a), 3(b) and 3(c) are schematic diagrams of another structure of an STA identifier according to an embodiment of the disclosure; and FIG. 4 is a schematic diagram of a structure of an identifier assignment device in a WLAN according to the disclosure.

DETAILED DESCRIPTION

Figures 1, 2A, 2B, 2C:
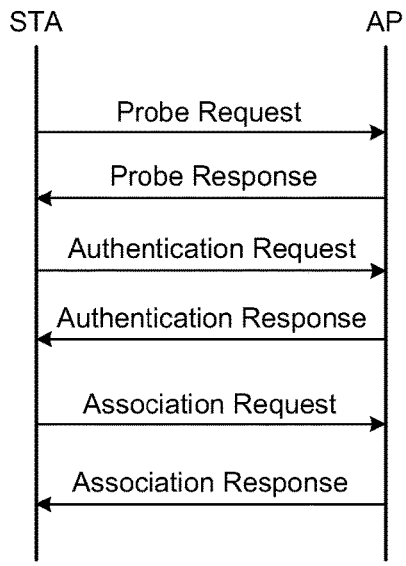
FIG. 1 is a flow chart where an STA accesses to an AP.
FIGS. 2(a), 2(b) and 2(c) are schematic diagrams of a structure of an STA identifier according to an embodiment of the disclosure.

The basic idea of the disclosure is that: STAs accessing to an AP are grouped, and a corresponding group identifier is set for each the STAs. In this way, numerous STAs accessing to the AP can be identified by a terminal identifier and in conjunction with the group identifier. Since the terminal identifier is significantly expanded through the setting of the group identifier, a unique identifier can be assigned to the STA accessing to the AP without identifier repetition of the STA.

In order to make the purpose, technical solution and advantages of the disclosure clearer and easier to understand, the disclosure is further elaborated below with reference to embodiments and the drawings.

FIGS. 2(a), 2(b) and 2(c) are schematic diagrams of a structure of an STA identifier according to an embodiment of the disclosure. As shown in FIGS. 2(a), 2(b) and 2(c), the embodiment of the disclosure mainly shows the constituent of group identifier information and terminal identifier information and shows that the STA is identified by the combination of the group identifier and the terminal identifier. The group identifier information may be composed of some bits in an AID (2 bytes), e.g., composed of high $13^{th}$-$15^{th}$ bits as shown in FIGS. 2(a) and 2(b). Alternatively, as shown in FIG. 2(c), a corresponding group identifier byte (1 byte) is specifically set as the group identifier, and a corresponding bit in the group identifier byte is used as the group identifier. Detailed description will be given below.

In a format as shown in FIG. 2(a), the group identifier information and the station identifier information occupy a total of 2 bytes. Low 13 bits (Bit 0 to Bit 12) are used as the station identifier information, and Bit 13 to Bit 15 are used as the group identifier information. In this way, $2^3$ (i.e., 8) groupings can be supported in one BSS at most, and each grouping can support up to $2^{13}$ (i.e., 8192) STAs. In a format as shown in FIG. 2(b), the group identifier information and the station identifier information also occupy a total of 2 bytes. Low 13 bits (Bit 0 to Bit 12) are used as the station identifier information, Bit 13 is used as the group identifier information, and the highest two bits (Bit 14 and Bit 15) are reserved for future extension. In this way, 2 groupings can be supported in one BSS at most, and each grouping can support up to $2^{13}$ (i.e., 8192) STAs. In a format as shown in FIG. 2(c), a group identifier field occupies 1 byte, and a terminal identifier field occupies 2 bytes. Except for the reserved bits and bits for other use, at least 13 bits of the terminal identifier field can be used as the station identifier information. Except for the reserved bits and bits for other use, at least 1 bit of the group identifier field can be used as the group identifier information. What these three formats as shown in FIG. 2 have in common is that the terminal identifier information that the AP assigns to the STA is unique in the BSS, the AP can distinguish each STA through the terminal identifier, and but it is impossible to ensure that the assigned group identifier information is unique. That is, for the STA identifier as shown in FIG. 2, unique identifier information can be assigned to the accessed AP only through the terminal identifier therein to implement identifying each accessing STA. However, the group identifier is used for grouping each STA that has accessed to the AP. Since bits assigned to the group identifier are limited, the number of groupings supported is limited.

FIGS. 3(a), 3(b) and 3(c) are schematic diagrams of a structure of an STA identifier according to an embodiment of the disclosure. As shown in FIGS. 3(a), 3(b) and 3(c), the embodiment of the disclosure mainly shows the constituent of group identifier information and terminal identifier information and shows that the STA is identified by the combination of the group identifier and the terminal identifier. The group identifier information may be composed of some bits in an AID (2 bytes). Detailed descriptions will be given below.

In a format as shown in FIG. 3(a), the group identifier information and the station identifier information occupy a total of 2 bytes. Low 12 bits (Bit 0 to Bit 11) are used as the station identifier information, Bit 12 and Bit 13 are used as the group identifier information, and the highest two bits (the fourteenth bit and the fifteenth bit) are reserved. In this way, $2^2$ (i.e., 4) groupings can be supported in one BSS at most, and each grouping can support up to $2^{12}$ (i.e., 4096) STAs. In a format as shown in FIG. 3(b), the group identifier information and the station identifier information occupy a total of 2 bytes. Low 11 bits (Bit 0 to Bit 10) are used as the STA identifier information, Bit 11 to Bit 13 are used as the group identifier information, and the highest two bits are reserved for future extension. In this way, $2^3$ (i.e., 8) groupings can be supported in one BSS at most, and each grouping can support up to $2^{11}$ STAs. In a format as shown in FIG. 3(c), a group identifier field occupies 1 byte, and a terminal identifier field occupies 2 bytes. Except for the reserved bits and bits for other use, at most 12 bits of the terminal identifier field can be used as the STA identifier information at most. Except for the reserved bits and bits for other use, at least 1 bit of the group identifier field can be used as the group identifier information. What these three formats have in common is that the terminal identifier information that the AP assigns to the STA cannot be ensured to be unique in the BSS, the AP cannot distinguish each station through the terminal identifier information, and the assigned group identifier is also non-unique. However, the AP can distinguish each STA accessing to the AP through the combination of the terminal identifier and the group identifier. Namely, STAs having the same group identifier may have different terminal identifiers.

A way of implementing the assignment of the STA identifier according to the disclosure will be described below.

One station (STA1) that has not accessed to any network at present wishes to access to a network established by an AP1 after the basic information of the AP1 is detected by the STA1 through actively probing (as shown in FIG. 1) or passively receiving a Beacon frame. After a necessary authentication process is completed, the STA1 and the AP1 proceed to an association process. It is assumed that the number of the network access points may not exceed 6000, and the association process is as follows.

The STA1 sends an Association Request frame to the AP1 after acquiring a sending opportunity. In addition to basic capability information such as a data sending rate and a data receiving rate of the station, the Association Request frame also includes one or more of followings: an application category of the station, power saving capability of the station, operator's identifier information of the station, manufacturer's identifier information of the station and physical location information of the station.

After the AP1 receives the Association Request frame sent by the STA1, if it is agreed that the STA1 accesses to an BSS, the AP1 assigns the STA1 to one grouping according to information provided by the STA1 in the Association Request frame, and the AP1 adds a Group ID and/or a Station ID assigned to the STA1 in a returned Association Response frame.

When the association process is successful, the STA1 transmits subsequent frames along with the AP by using the assigned identifier information after the group identifier information and/or the station identifier information are/is acquired by the STA1.

One station (STA2) that has accessed to the network of the AP1 at present wishes to reassociate with the AP1. At this moment, the STA2 initiates a process of reassociating with the AP1. It is assumed that the number of the network access points may not exceed 6000, and the reassociation process is as follows.

The STA2 sends an Reassociation Request frame to the AP1 after acquiring a sending opportunity. In addition to basic capability information such as a data sending-receiving rate of the station, the Reassociation Request frame also includes one or more of followings: an application category of the station, power saving capability of the station, operator's identifier information of the station, manufacturer's identifier information of the station and physical location information of the station.

After the AP1 receives the Reassociation Request frame sent by the STA2, if it is agreed that the STA2 is reassociated, a new identifier is reassigned to the STA2 according to information provided by the STA2 in the Reassociation Request frame, and the AP1 adds a new Group ID and/or a new Station ID assigned to the STA1 in a returned Association Response frame.

When the reassociation process is successful, the STA2 performs frame switching with the AP by using the new identifier information after the reassigned group identifier information and/or the reassigned station identifier information are/is acquired by the STA2.

FIG. 4 is a schematic diagram of a structure of an identifier assignment device in a WLAN according to the disclosure. As shown in FIG. 4, the identifier assignment device in the WLAN according to the disclosure includes a setting unit 40 and an assignment unit 41.

The setting unit 40 is configured to set a group identifier for an STA; and the assignment unit 41, located in an AP, is configured to, in a process during which the STA associates or reassociates to the AP, assign a terminal identifier to the associated or reassociated STA or assign a terminal identifier and a group identifier to the associated or reassociated STA.

On the basis of the identifier assignment device in the WLAN as shown in FIG. 4, the identifier assignment device in the WLAN according to the disclosure also includes:

a sending unit (not shown in FIG. 4) configured to return an association response frame or a reassociation response frame to the STA when the STA sends an association request frame or a reassociation request frame to the AP, wherein the association request frame or the reassociation request frame includes at least one of followings: application category information of the STA, power saving capability information of the STA, operator's identifier information of the STA, manufacturer's identifier information of the STA and physical location information of the STA; and the association response frame or the reassociation response frame includes the terminal identifier assigned by the AP to the STA, or the terminal identifier and the group identifier assigned by the AP to the STA.

The assignment unit 41 is further configured to determine grouping of the STA and the group identifier according to at least one of followings: the application category information of the STA, the power saving capability information of the STA, the operator's identifier information of the STA, the manufacturer's identifier information of the STA and the physical location information of the STA.

The group identifier is composed of bits in bytes corresponding to an AID; or the group identifier is composed of bits in a separately set byte.

The AID is 2 bytes, and the separately set byte is 1 byte; and the terminal identifier is 11 bits, or 12 bits, or 13 bits, and the group identifier is 1 bit, or 2 bits, or 3 bits.

Those skilled in the art should understand that a function of a processing unit involved in the identifier assignment device in the WLAN can be implemented by a hardware circuit or by corresponding software executed by a processor. The functions of the above processing units can be understood with reference to relevant descriptions of the aforementioned identifier assignment method in the WLAN according to the disclosure.

The above are only the preferred embodiments of the disclosure, and are not intended to limit the scope of protection of the claims of the disclosure.

INDUSTRIAL APPLICABILITY

In the disclosure, an STA accessing to an AP is grouped, and a corresponding group identifier is set for the STA. Numerous STAs accessing to the AP can be identified by a terminal identifier and in conjunction with the group identifier. Since the terminal identifier is significantly expanded through the setting of the group identifier, a unique identifier can be assigned to the STA accessing to the AP without identifier repetition of the STA.

The invention claimed is:

1. An identifier assignment method in a wireless local area network, wherein the method comprises:
   in a process during which a non-Access Point Station (STA) associates or reassociates to an Access Point (AP), assigning a terminal identifier and a group identifier to the associated or reassociated STA, the group identifier being assigned via an association response frame or a reassociation response frame from the AP,
   wherein the assigning a terminal identifier and a group identifier to the associated or reassociated STA comprises:
   sending, by the STA, an association request frame or a reassociation request frame to the AP, wherein the association request frame or the reassociation request frame includes at least one of followings: application category information of the STA, power saving capability information of the STA, operator's identifier information of the STA, manufacturer's identifier information of the STA and physical location information of the STA; and
   returning, by the AP, the association response frame or the reassociation response frame to the STA, wherein the association response frame or the reassociation response frame includes the terminal identifier and the group identifier assigned by the AP to the STA.

2. The method according to claim 1, wherein the AP determines grouping of the STA and the group identifier according to at least one of followings: the application category information of the STA, the power saving capability information of the STA, the operator's identifier information of the STA, the manufacturer's identifier information of the STA and the physical location information of the STA.

3. The method according to claim 1, wherein the group identifier is composed of bits in bytes corresponding to an Association Identifier (AID); or
   the group identifier is composed of bits in a separately set byte.

4. The method according to claim 3, wherein the AID is 2 bytes, and the separately set byte is 1 byte.

5. The method according to claim 3, wherein the terminal identifier is 11 bits, or 12 bits, or 13 bits, and the group identifier is 1bit, or 2bits, or 3 bits.

6. An identifier assignment device in a wireless local area network, comprising an assignment unit, wherein
   the assignment unit, located in an Access Point (AP), is configured to, in a process during which a non-Access Point Station (STA) associates or reassociates to the AP, assign a terminal identifier and a group identifier to the associated or reassociated STA, the group identifier being assigned via an association response frame or a reassociation response frame from the AP,
   wherein the device further comprises a sending unit configured to return the association response frame or the reassociation response frame to the STA when the STA sends an association request frame or a reassociation request frame to the AP,
   wherein the association request frame or the reassociation request frame includes at least one of followings: application category information of the STA, power saving capability information of the STA, operator's identifier information of the STA, manufacturer's identifier information of the STA and physical location information of the STA; and
   the association response frame or the reassociation response frame includes the terminal identifier and the group identifier assigned by the AP to the STA.

7. The device according to claim 6, wherein the assignment unit is further configured to determine grouping of the STA and the group identifier according to at least one of followings: the application category information of the STA, the power saving capability information of the STA, the operator's identifier information of the STA, the manufacturer's identifier information of the STA and the physical location information of the STA.

8. The device according to claim 6, wherein the group identifier is composed of bits in bytes corresponding to an Association Identifier (AID); or
   the group identifier is composed of bits in a separately set byte.

9. The device according to claim 8, wherein the AID is 2 bytes, and the separately set byte is 1 byte; and
   the terminal identifier is 11 bits, or 12 bits, or 13 bits, and the group identifier is 1 bit, or 2 bits, or 3 bits.

* * * * *